Oct. 12, 1965   W. W. CHAMBERS   3,211,214
TEMPERATURE CONTROL CIRCUIT
Filed Oct. 2, 1963   4 Sheets-Sheet 1
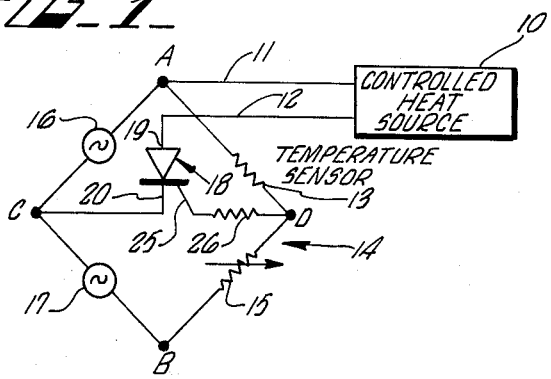
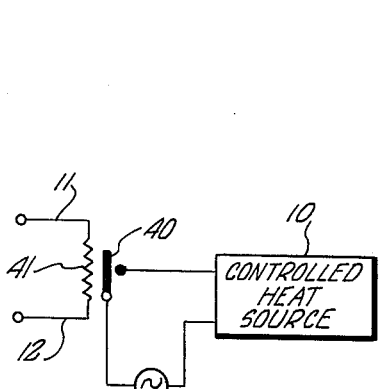
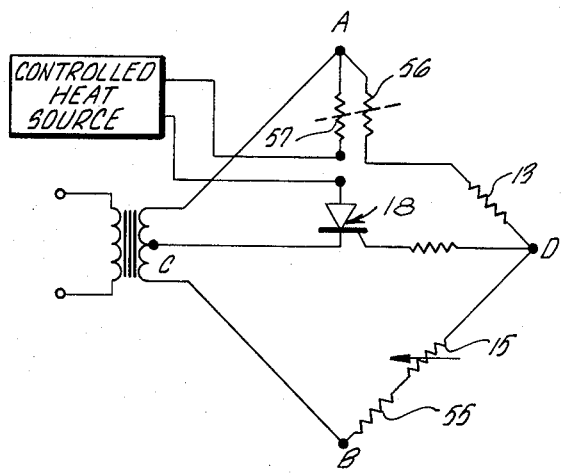
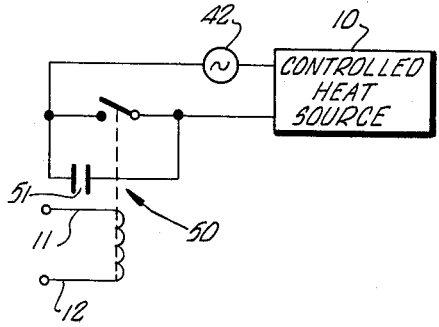
INVENTOR.
WILLIAM W. CHAMBERS
BY
FOWLER AND KNOBBE
ATTORNEYS.

INVENTOR.
WILLIAM W. CHAMBERS
BY
FOWLER AND KNOBBE
ATTORNEYS.

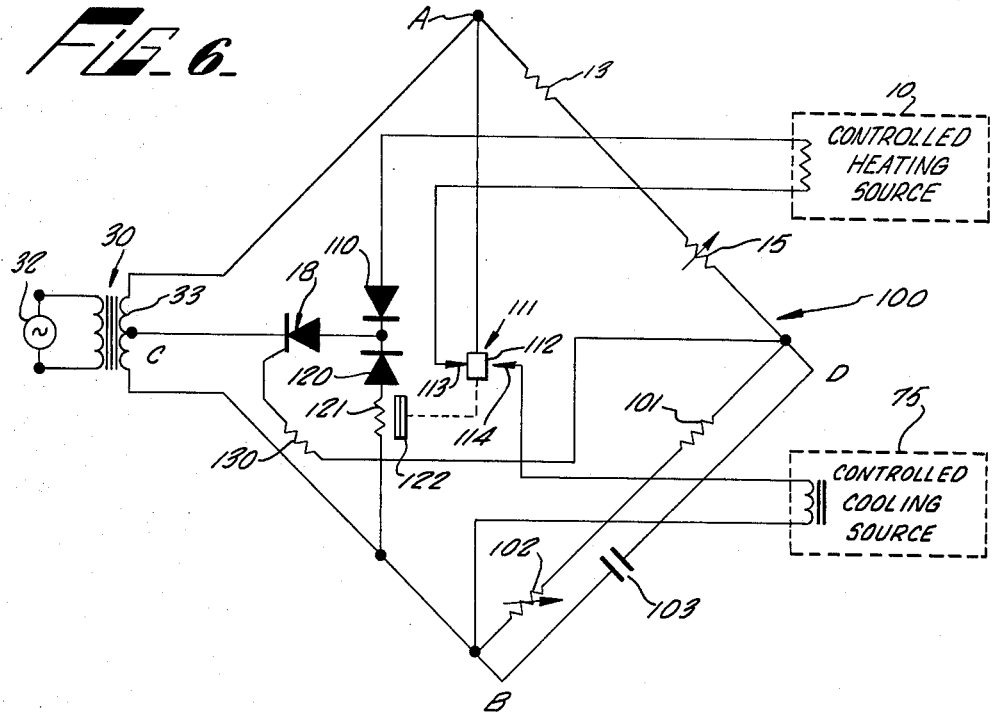
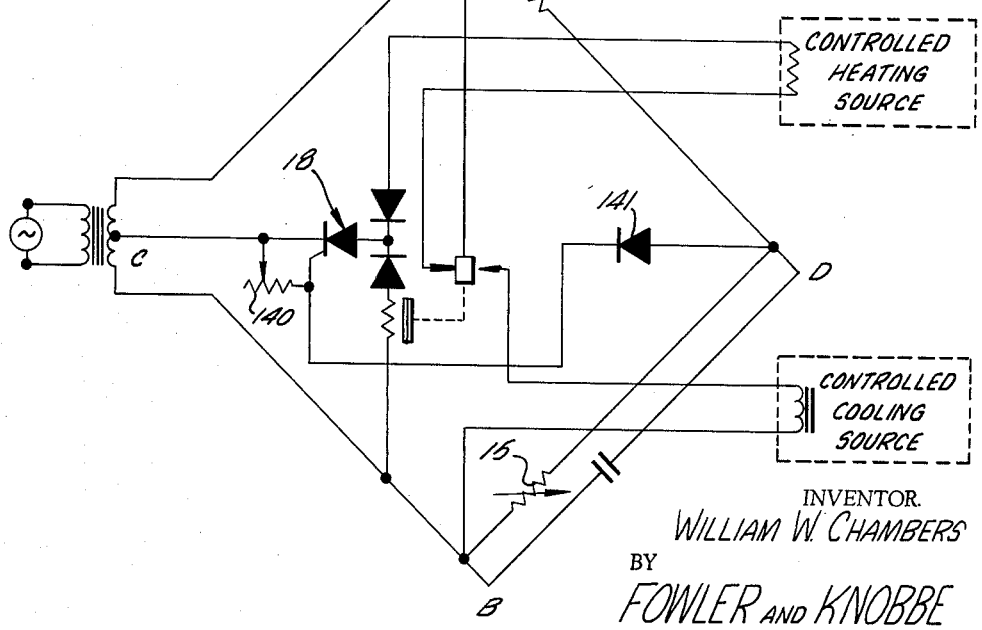

INVENTOR.
WILLIAM W. CHAMBERS
BY
FOWLER AND KNOBBE
ATTORNEYS.

United States Patent Office 3,211,214
Patented Oct. 12, 1965

3,211,214
TEMPERATURE CONTROL CIRCUIT
William W. Chambers, Anaheim, Calif., assignor to Robertshaw Controls Company, Richmond, Va., a corporation of Delaware
Filed Oct. 2, 1963, Ser. No. 314,585
17 Claims. (Cl. 165—28)

This application is a continuation-in-part of application Serial No. 247,674, filed December 27, 1962, and now abandoned.

The present invention relates generally to temperature control circuits and, more particularly, to an improved circuit using a controlled rectifier for controlling the operation of a heating or cooling source, or both, in response to environmental temperature changes.

Temperature control systems are a necessary adjunct of modern heating and cooling systems. For example, heating and cooling systems for the home normally include a temperature sensing means for controlling the output of the heating or cooling source. Similarly, home appliance ovens include a similar feedback control for insuring that the oven temperature is maintained at the preselected value. In many of these systems, the temperature sensitive control (usually known as a thermostat) comprises an electrical switch in which a bimetallic strip makes or breaks an electrical contact. The making and breaking of an electrical circuit may in turn control the flow of fuel into a furnace or a flow of current into an electrically heated oven.

Although these prior art thermostats have achieved extensive use, they have certain definite disadvantages. Thus, they are relatively slow to detect a change in temperature and actuate a compensating device. They provide only an ON-OFF control, not a control signal proportioned to the heating or cooling required. And their electrical contacts are subject to wear thereby decreasing the reliability of the prior art devices and increasing their maintenance costs.

Thermistors and like devices suggest another means for sensing temperature changes of a controlled environment. These devices make use of the change of resistivity of a semiconductor with change in temperature to provide a resistance which is systematically related to the temperature. The classical thermistor has a large negative temperature coefficient of resistance of the order of a percent per degree centigrade. For a detailed review of these devices, see the article by J. A. Becker, et al., entitled, "Properties and Uses of Thermistors—Thermally Sensitive Resistors," published in the A.I.E.E. Transactions, volume 65, pp. 711–725; November, 1946.

Temperature control systems incorporating thermistors in combination with thyratrons and vacuum tubes have been constructed heretofore. These systems, however, also have one or more disadvantages and limitations which obviate their universal application. The thyratron and vacuum tube circuits, for example, require both a supply of filament current and an input voltage of substantial magnitude. Moreover, these devices are not capable of performing their operation for an indefinite period of time without deterioration of their operating characteristics. A further disadvantage of these circuits is that they are sensitive to normal fluctuations in the line voltage.

Another prior art temperature control system shown in U.S. Patent No. 3,062,942—Finlay et al. includes a temperature sensing resistor and transistor amplifier. Although no filament current or high voltage supply is required for this circuit, it, too, has disadvantages which preclude its use in many applications. Thus, transistors are low voltage-low current devices not adapted for delivering large amounts of power. It is, therefore, not feasible to drive directly a heating element with the transistor output current. Instead, as shown in the Finlay et al. patent, an intermediate control device such as a hot wire type relay having make-and-break contacts is required. Another disadvantage of systems employing transistors is that the transistor operates as a variable resistor and supplies an output current while having a substantial potential applied across its terminals. The resulting power dissipation within the semiconductive element causes undesirable heating thereof and limits the amount of power which may be supplied to the controlled element. A further limitation of many of the control circuits described above, including the apparatus described in the Finlay et al. patent, is that multiple electrical connections must be made between the temperature sensing element, the temperature regulating element and the remainder of the circuitry. By way of specific example, the apparatus described in the Finlay et al. patent requires four electrical leads connected between the temperature sensor element, a rheostat serving as the temperature selector, and the other control circuitry.

It is an object of the present invention to provide a temperature control circuit which does not require make-and-break electrical contacts, a high input voltage, a filament current supply, or a substantial power dissipation in a semiconductor element.

Another object of this invention is to provide a temperature control circuit which directly supplies the heating current to an electrical heating element.

It is a further object of this invention to provide a temperature control circuit which requires only two electrical leads between the temperature sensing element and the temperature regulating element and the remainder of the control circuitry.

It is still an additional object of this invention to provide a temperature control circuit which is substantially insensitive to sharp voltage peaks in the control circuit and to fluctuations in line voltage.

Other and further objects, features and advantages of the invention will become apparent as the description proceeds.

Briefly, in accordance with a preferred form of the present invention, a temperature control circuit comprises a temperature sensing thermistor and a temperature adjusting rheostat arranged as respective legs of a bridge circuit which is energized by a low voltage alternating current source. A controlled diode (preferably a silicon controlled rectifier) is connected to this bridge so that its anode is driven positive with respect to its cathode for periodic half-cycles of the alternating current input. The firing of this controlled rectifier and the period of time for which it is fired for each of these periodic half-cycles is controlled by connecting its control or base electrode between the thermistor and the temperature adjusting rheostat. A change in temperature of the controlled environment causes a change in resistance of the thermistor thereby resulting in an unbalance of the bridge circuit. Bridge unbalance produces a current flow in the control electrode of the controlled diode such that the rectifier fires for a period of time during each positive half-cycle which is proportional to the amount of bridge unbalance. During each of these firing intervals, a large current may be conducted between the anode and cathode of the controlled rectifier. This current flow may directly supply an electrical heating element or actuate an intermediate relay or solenoid which in turn controls the amount of current or fuel delivered to a heating or cooling source.

A modification of the invention described in detail hereinafter compensates for the change in firing point of the controlled rectifier caused by a change in ambient temperature. Another modification also taught below introduces a thermally coupled feedback path within the bridge circuit to increase the sensitivity of response of the temperature control system.

This invention further describes a system for controlling both heating and cooling elements. Such a system is thus adapted for maintaining a home or other environments at a constant temperature during changing climes. In a preferred embodiment thereof, a single controlled rectifier is selectively fired by either half of each A.C. cycle, which half it is being determined by the direction in which the bridge is unbalanced. In a representative example, the heating source is energized when the controlled rectifier is fired by the positive A.C. half-cycles, while the cooling source is energized when the controlled rectifier is fired by the negative A.C. half-cycles. When the bridge is balanced, denoting that the environment temperature is equal to the preselected temperature, the controlled rectifier is not fired and neither the heating nor cooling source is energized.

A more thorough understanding of the invention may be obtained by a study of the following detailed description taken in connection with the accompanying drawings in which:

FIG. 1 is a simplified circuit schematic illustrating a temperature control system constructed in accordance with this invention;

FIG. 2 is a more detailed circuit schematic for the system shown in FIG. 1;

Figure 5:
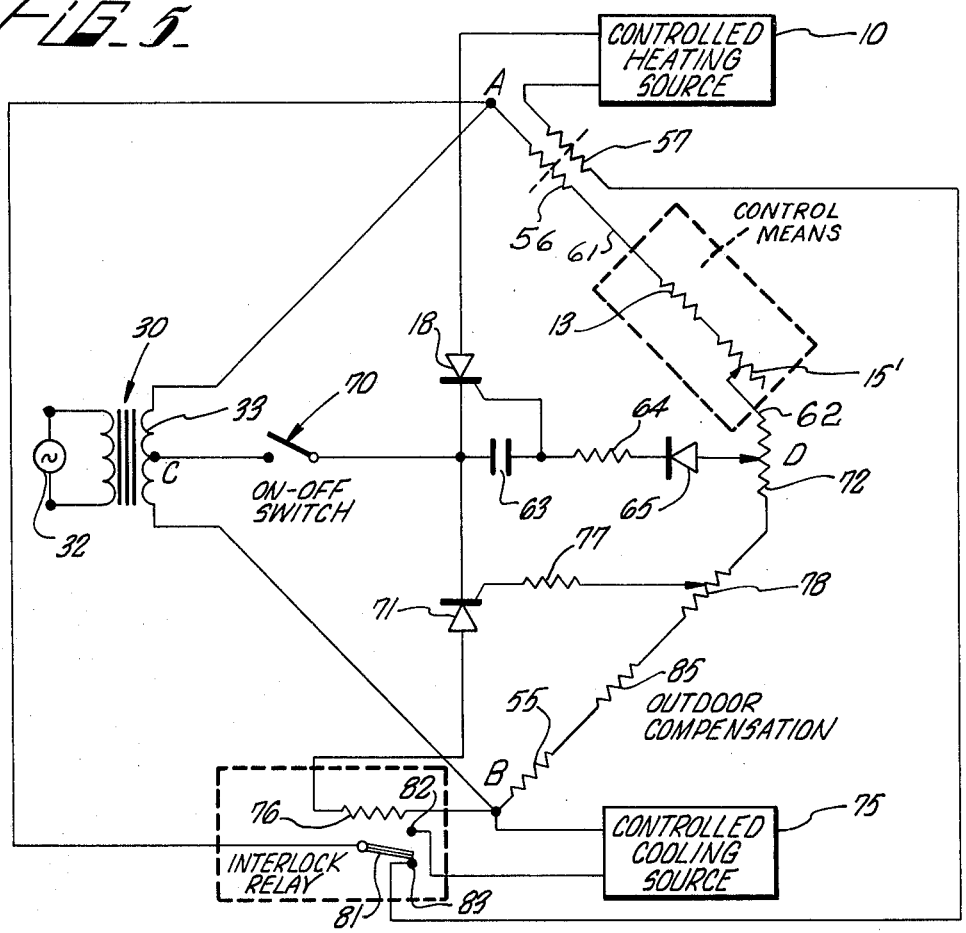
Figure 3C:
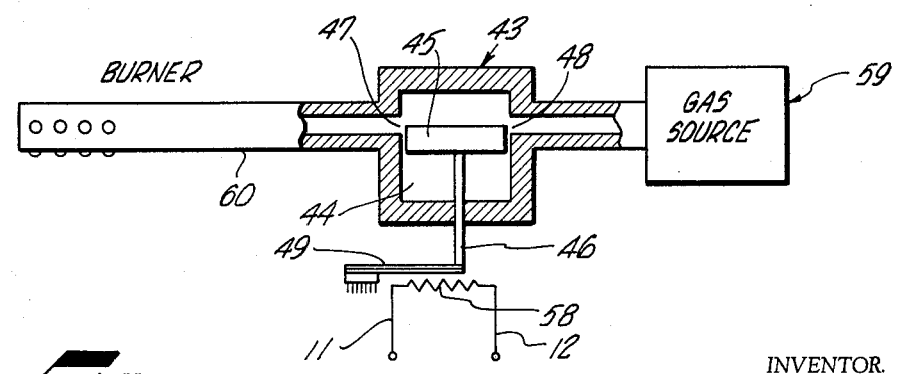
Figure 9:
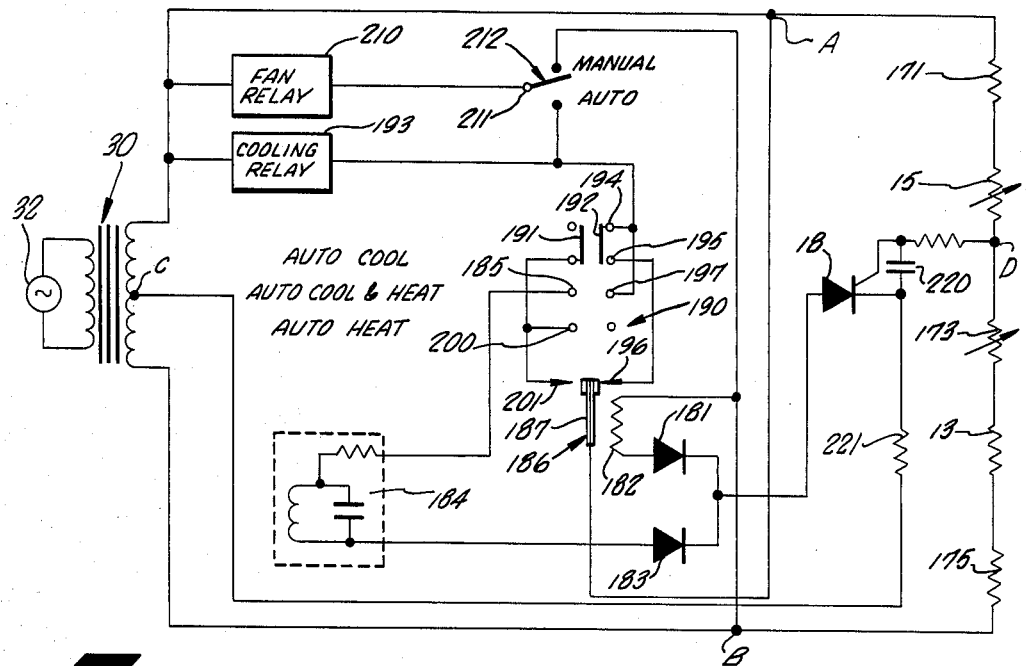
Figure 8:
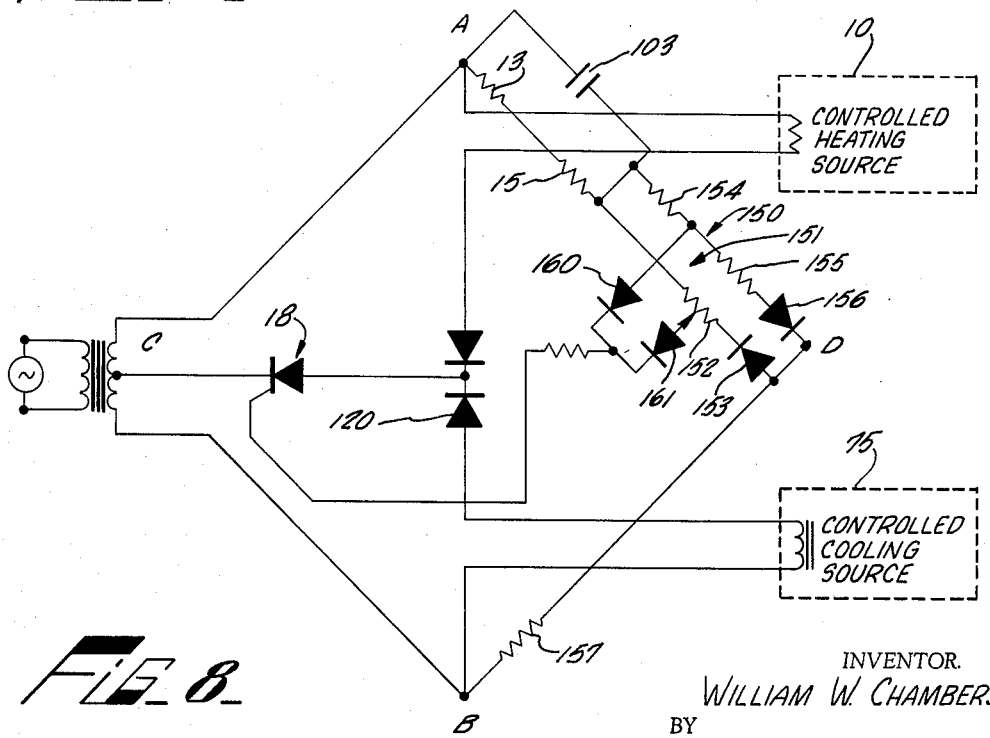

FIGS. 3a, 3b, and 3c illustrate intermediate control devices which may be included in the temperature control systems of FIGS. 1, 2, 4, and 5;

FIG. 4 illustrates schematically a modification of the system shown in FIGS. 1 and 2 which incorporates a means for compensating changes in the operating characteristics of the controlled rectifier caused by ambient temperature changes and a means for introducing thermally coupled feedback for increasing the sensitivity of response of the system;

FIG. 5 illustrates schematically a system for controlling both heating and cooling elements;

FIG. 6 illustrates schematically an embodiment of the present invention wherein a single controlled rectifier automatically controls the energization of both heating and cooling sources;

FIGS. 7 and 8 illustrate additional embodiments wherein a single controlled rectifier automatically controls both heating and cooling sources, these embodiments providing a variable dead band; and FIG. 9 is a detailed schematic of a system wherein a single controlled rectifier selectively controls either a heating source or a cooling source or both.

Referring now to FIG. 1, a temperature control system is shown comprising a controlled heat source 10 responsive to a control current flowing in electrical leads 11, 12. The heat source 10 is assumed to heat or cool an environment which is desired to be maintained at a substantially constant and pre-selected temperature. Within or in close thermal proximity to this environment is located a temperature sensor comprising a positive temperature coefficient thermistor 13 connected as one leg AD of bridge 14. In series with this temperature sensor in the adjacent bridge leg DB is a rheostat 15 which is adjusted to obtain a pre-selected temperature for the controlled environment. This rheostat preferably has a small temperature coefficient of resistivity so that the control point is relatively unaffected by ambient temperature around the potentiometer. In each of the opposite bridge legs AC and CB are located equal and in-phase alternating current sources 16 and 17.

A controlled rectifier 18 is connected to the bridge 14 so that its anode 19 and cathode 20 are in series with the controlled heat source 10 between bridge nodes A and C and its control or base electrode 25 is connected to bridge node D via current limiting resistor 26. The controlled rectifier is a semiconductor element in which the control electrode current regulates the firing and resulting flow of anode-cathode current for forward anode-cathode bias. The anode-cathode current is blocked when the device is reverse biased. A more detailed description of the structure and operation of this device is provided below.

The operation of the temperature control system shown at FIG. 1 is as follows: Assuming that the temperature selected by the temperature adjusting rheostat 15 is being maintained by the controlled heat source 10, the resistance values of the thermistor 13 and rheostat 15 will be substantially equal. The bridge 14 is then balanced at this equilibrium temperature and no control current flows through resistor 26 into the control electrode 25 of the controlled rectifier 18 (since there is no potential difference between bridge nodes C and D). Assume, however, that the temperature of the controlled environment decreases and so becomes less than the desired temperature. The resistance of the thermistor sensing element then decreases (because of its positive temperature coefficient). The bridge is then unbalanced, the voltage drop across bridge leg AD being less than the voltage drop across the leg DB. During half-cycles of positive polarity of the in-phase sources 16, 17, the bridge unbalance produces a positive voltage between bridge nodes D and C. These same positive half-cycles forwardly bias the anode-cathode of the controlled rectifier. Consequently, a current flows from node D to node C through the control electrode and cathode of the controlled rectifier causing the then forwardly biased element to fire. The resulting flow of anode to cathode current causes a flow of control current through leads 11, 12 to the controlled heat source 10 which in turn provides an increased heat output. The resulting temperature rise is detected by the temperature sensor 13, this element increasing in resistance and thus decreasing the control current flowing into the controlled rectifier 18 during the positive half-cycles of A.C. input. When the bridge is at or very near a balanced condition, the control current is reduced to a sufficiently low value so that the rectifier completely ceases to fire, thereby blocking the flow of control current to the controlled heat source 10.

The controlled rectifier resets itself during each negative half-cycle of the A.C. input. During this reset period, the cathode is positive with respect to the anode, thus forcing the rectifier to turn off even though a current is being supplied into its control electrode. This periodic resetting at a fairly high rate, i.e., 60 times per second for a 60-cycle alternating current input, makes it possible for the control circuit to respond rapidly to a change in bridge circuit balance resulting from a change of the resistance of the temperature sensor thermistor 13.

Another advantage of the temperature control system of FIG. 1 is that it is relatively insensitive to normal fluctuations in magnitude of the input A.C. voltage. Thus, assume that sources 16, 17 increase or decrease in magnitude of the input A.C. voltage. Thus, assume that sources 16, 17 increase or decrease in magnitude. Although the voltages across each of the legs AD, DB, AD and CB respectively increase or decrease, the balance or unbalance of the bridge remains unchanged, i.e., the potential between nodes D and C does not change. Since it is this potential which controls the flow of current through the control electrode 25, the firing of the controlled rectifier is substantially independent of usual input voltage variations. By way of specific example, a home appliance oven constructed in accordance with this invention supplied an average temperature between the limits of 257° and 265° Fahrenheit for line voltage changes between 100 and 128 volts, i.e., a 28% increase in line voltage resulted in only a 3.1% increase in oven temperature.

A detailed circuit schematic for the temperature control system shown in FIG. 1 and described hereinabove is illustrated in FIG. 2. For ease of understanding, those elements in FIG. 2 which may be identical to those in FIG. 1 have been given the same identification numerals. As shown, the bridge 14 is energized by means of a transformer 30 having a primary winding 31 adapted to be connected to an alternating source 32 and a center tapped secondary winding 33 having its end terminals connected to nodes A and B of the bridge, respectively, and its center tap connected to the cathode 20 of the controlled rectifier 18. Accordingly, equal and in-phase potentials are applied to the respective bridge legs AC and CB at a reduced potential depending upon the turns ratio of the primary and secondary windings 31, 33.

As shown in FIG. 2, the usual controlled rectifier 18 comprises a P–N–P–N semiconductive element having the four semiconductive regions $P_1$, $N_1$, $P_2$, $N_2$ which form the junctions $J_1$, $J_2$ and $J_3$. This P–N–P–N diode controls current flow between its anode and cathode in response to current flow into its control or base electrode 23 in the following manner: With no control current supplied the diode region $P_2$, a substantial potential must be applied between the anode 19 and the cathode 20 in order to cause a flow of anode to cathode current. This potential is known as the break over or break down voltage. This high potential will not be achieved in normal operation of the temperature control systems described herein. However, if a relatively small control current is applied to region $P_2$ via the control electrode 25 in the same direction as the current across the junction $J_3$, the voltage at which the diode conducts is substantially decreased since this control current flow increases the current gain or alpha of the region $P_2$ independently of the anode-cathode current or voltage. Consequently, the regenerative condition is reached for a lower anode-cathode voltage. A small current thus controls the point at which the diode fires or conducts for positive half-cycles of the alternating current input (since the device is reversed biased to a non-conductive state by negative half-cycles of the A.C. input). Negative cycles of input voltage reset the device to its non-conductive state. For a more detailed explanation of the structure and function of the controlled rectifier, reference is made to the article entitled, "The Electrical Characteristics of Silicon P–N–P–N Triodes," by I. M. Mackintosh, published in the Proceedings of the I.R.E., June, 1948, p. 1229; and article entitled "Multiterminal P–N–P–N Switches," by R. W. Aldrich and N. Holonyak, Jr., published in the same issue of the I.R.E. Proceedings at p. 1236.

When the controlled rectifier has been fired, the anode-cathode current is limited only by the external voltage and the impedance of the load to which it is connected so long as the current rating of the device is not exceeded. The operation of the device is such that it has a very low impedance when fired and a very high impedance at other times. Accordingly, at no time is there a substantial power dissipation within the semiconductive element. Controlled rectifiers are currently available with current handling capacities of over 50 amperes. This large current capacity makes it possible to directly energize an electrical resistance heating element 34 as shown in FIG. 2. In particular, a high-current modification of the P–N–P–N three terminal diode is preferred and is known in the art as a silicon controlled rectifier or SCR.

The magnitude of control current varies the point at which the diode fires or conducts for positive half-cycles of the A.C. input. Thus, the output of the controlled rectifier may vary from approximately 50% to 85% of the anode-cathode positive half-cycle input. Temperature control systems constructed as shown therefor provide a control signal proportional to the amount of heating or cooling necessary to return the environment to the desired temperature. Additional control over the firing point of the controlled rectifier may be achieved by the phase shifting means taught and claimed in this inventor's copending application entitled, "Temperature Control Arrangements," Serial No. 223,984 filed September 17, 1962 and assigned to Robertshaw Controls Company, assignee of the present invention. An adaption of phase shifting means to this invention is described hereinafter.

In the systems of FIGS. 1 and 2, the positions of the temperature sensor 13 and temperature selector rheostat may be reversed if a negative temperature coefficient thermistor is used as the temperature sensing element. Thus, the temperature sensor is then located in bridge leg DB and the rheostat 15 is located in bridge leg AD. Whichever type of thermistor is used will be largely determined upon the electrical characteristics and cost of the two different types. At the present time, positive temperature coefficient thermistors are available having a higher resistance change per degree temperature change than their negative temperature coefficient counterparts. Representative values are a maximum of resistance change of 7% per degree centigrade for the positive temperature coefficient elements and a maximum of 4% to 5% per degree centigrade for the negative temperature coefficient elements. The highest sensitivity systems are thus afforded by positive temperature coefficient elements.

It will be noted that the output of the controlled rectifier in the embodiments of FIGS. 1 and 2 is in parallel with the leg AC of the bridge circuit. Firing of the controlled rectifier may thus alter the balance which existed in the bridge circuit just prior to the moment of firing, particularly if the power supply is poorly regulated. Such is often the case in home appliances since it is desirable for safety that the transformer 30 be able to withstand a direct short across its secondary without overheating. In the present invention, however, the degree of regulation does not materially affect control circuit performance since the magnitude of bridge unbalance is utilized only to determine whether the controlled rectifier will fire at all and if so at what particular point in time it fires during a particular positive half-wave of the A.C. bridge input. After firing occurs, the amount of control current is of little consequence as long as maximum allowable ratings of the control circuit are not exceeded and as long as the anode current exceeds the minimum current necessary to hold the diode in its fired state.

In the embodiment shown in FIG. 2, the load current supplied heater resistance element 34 is periodically shut off because of the resetting of the controlled rectifier 18 by the A.C. input voltage. In some applications, this interruption of the heating power may be undesirable. A load circuit shown in FIG. 3a may then be utilized, this load comprising an electric switch having a movable bimetallic contact arm 40 and a heating resistor 41 in close proximity thereto. The anode-cathode current of the control rectifier is applied to this heating resistor by leads 11 and 12. Upon heating, the bimetallic arm 40 closes an electrical circuit between the controlled heat source 10 and a power source 42. This system will be insensitive to the negative half-cycles which cause an interruption of current in leads 11, 12 since the switch arm 40 will remain closed for the short time interval that the heater current is not supplied heater resistance 41.

In some temperature control systems, the controlled rectifier may not have a sufficient current carrying capacity to directly operate the load. This may be true even in those applications which require a current of less than 50 amps, since the higher rated rectifiers cost substantially more than those having a lower current carrying capacity. The load circuit shown in FIG. 3b may therefore be desirable when expense of the rectifier is a significant factor of the system cost. As shown in this figure, the relay 50 is connected to leads 11, 12 so as to be actuated by the anode-cathode current of the controlled rectifier. The movable contact of this relay controls the flow of power from source 42 to the controlled heat source 10. In this manner, a small current flow from the controlled rectifier may be used to control a substantially larger current flow from the source 42 to the heat source 10. Capacitor 51 will normally be connected across the relay contacts to prevent a deleterious arcing caused by the periodic opening and closing of the relay in response to the current supplied by the controlled rectifier.

In FIG. 3c is shown a gas control system particularly adapted for the proportional control provided by temperature control circuits of this invention. The gas control valve 43 is connected between gas source 59 and burner 60 which may be an ordinary oven or furnace burner. The valve 43 includes a cylindrical chamber 44 in which a piston 45 is slidably mounted upon shaft 46. Movement of the piston 45 within the chamber varies the restriction of the valve ports 47, 48 thereby varying the amount of gas supplied the burner 60 from the gas source 59. Piston 45 is actuated by a bimetallic cantilever member 49 located proximate heater resistor 58. The amount that the piston 45 is displaced so as to uncover the ports 47, 48, is proportional to the amount of current flowing through the conductors 11, 12, to the heater resistor 58. Accordingly, the amount of gas delivered to the burner 45 is proportional to the current delivered from the temperature control circuit via leads 11, 12.

A significant advantage of the present invention is that only the temperature sensing thermistor element need be located in or near the controlled environment. The remainder of the bridge circuit may be in any convenient location where ambient temperature will not adversely affect the operation of the bridge circuit or its individual components. In some applications, however, it will not be possible to insulate the bridge components from a variable ambient temperature. This will affect to some extent the operational performance of the circuit since the electrical parameters of silicon controlled rectifiers are affected by changes in ambient temperature. Thus, as the ambient temperature varies, the firing voltage and the firing point (defined by the anode-cathode potential and the control current) will vary. For example, higher ambient temperatures will require less control current to fire the rectifier at a particular anode-cathode potential.

The system shown in FIG. 4 illustrates both an ambient temperature compensation and also a means for providing thermally coupled feedback to increase the sensitivity of response of the system. The ambient temperature compensation comprises a temperature sensitive thermistor element 55 connected in either bridge leg AD or leg DB depending upon its temperature coefficient of resistance. In the specific embodiment shown, the element has a negative temperature coefficient of resistance and is connected in series with the temperature adjusting rheostat in the bridge leg DB. Element 55 is physically located proximate the controlled rectifier 18 so as to be subjected to the same ambient temperature as the rectifier element. The operation of element 55 is as follows: As the ambient temperature increases, the resistance of element 55 and bridge leg DB decreases, thereby reducing the amount of unbalance in the bridge for a given voltage across the temperature sensor 13. The control current is therefore appropriately reduced to compensate for increased ambient temperature of the controlled rectifier (which fires with less control current at the elevated temperature). Conversely, for a decrease in ambient temperature, the ambient temperature resistance 55 will tend to increase the amount of firing unbalance. It will be apparent to those having ordinary skill in the art that the appropriate selection of circuit components will provide substantial ambient compensation. It will also be apparent that the ambient temperature compensating resistor 55 may have a positive temperature coefficient of resistance in which case it will be located in the bridge arm AD in series with the sensor 13 which has a positive temperature coefficient of resistance.

The sensitivity of response of the systems previously used may be improved as shown in FIG. 4 wherein heater resistance 57 is connected in series with the anode circuit of the controlled rectifier. This resistance, when energized, increases the temperature of a thermistor 56 having a positive temperature coefficient of resistance. This element is connected in series with the environment temperature sensing thermistor 13. If the controlled rectifier is fired by each positive cycle of A.C. input (in response to a decrease in ambient temperature), the thermistor 56 is in turn heated by the current flow through resistor 57. Heating of thermistor 56 increases the resistance of bridge leg AD thereby decreasing the bridge unbalance and in turn reducing the controlled rectifier output sooner than would be the case if the thermally coupled feedback was not present. The feedback temperature sensing element 56 may also have a negative temperature coefficient of resistance; this element will then be located in series with the temperature adjusting rheostat 15 in bridge leg DB.

A temperature control system adapted for controlling both heating and cooling elements is shown in FIG. 5. For convenience, those components in FIG. 5 which may be identical to those in the foregoing figures have been given the same identification numerals. The controlled heat source 10 is located in the anode circuit of controlled rectifier 18 via an interlock switch 80 described in detail hereinafter. As in the foregoing embodiments, the firing of controlled rectifier 18 upon positive half-cycles of the alternating current input is controlled by a positive temperature coefficient thermistor 13 located in bridge leg AD. The bridge circuit is energized by alternating current source 32 coupled to transformer 30. As in the foregoing embodiment, this transformer is normally a step-down type transformer for reducing the line potential of, for example, 120 volts to an output potential across the secondary winding of 24 volts.

The bridge circuit further includes a temperature adjusting rheostat 15' located in series with sensor 13 in bridge leg AD. The sensor 13 and temperature adjusting rheostat 15 form a control means particularly adapted for room temperature control, since only the two wires 61, 62 need to be run to the thermostat element from the remainder of the control circuitry. The circuitry controlling the firing of rectifier 18 includes a phase shift network comprising capacitor 63 and resistor 64. This circuit allows the firing of the controlled rectifier 18 to be delayed until practically the end of the positive half-wave cycle. The conductive angle of the rectifier can therefore be made to vary from slightly more than 0° to slightly less than 180° of the input wave form. For a more detailed explanation of the operation of the phase shift network, reference is made to the copending application of the inventor entitled, "Temperature Control Arrangements" supra. Diode 65 prevents a reverse flow of current to the control electrode during the negative half-cycle. Under normal operating conditions, this diode is not required in this or the preceding embodiments since the reverse currents are ordinarily below the maximum value which the controlled rectifier will tolerate. The on-off switch 70 disconnects the cathodes of controlled rectifiers 18 and 71 from the center tap of the secondary winding 33 of transformer 30, thus disconnecting a flow of power to both the heating and cooling control circuits.

The calibrate potentiometer 72 controls the exact position of bridge node D and thus affords a control over the firing point of rectifier 18. In use, the thermistor 13 is placed in an environment having a predetermined desired temperature. The node D calibrate potentiometer is then positioned just below the firing point of rectifier 18.

The controlled cooling source 75 such as an air conditioner compressor is responsively connected to the controlled rectifier 71 which has its cathode and anode connected in series with the heater resistor 76 across bridge nodes C and B. The firing of rectifier 71 is determined by currents supplied its control electrode via the current limiting resistor 77. As shown, this resistor is not connected directly to bridge node D but instead to the movable contact of a changeover differential potentiometer 78. By this arrangement, the controlled rectifier 71 always receives a slightly lower voltage than the controlled rectifier 18. There is thus a predetermined range in which neither the heating nor the cooling sources are activated.

The anode-cathode of controlled rectifier 71 are forwardly biased during negative half-cycles of the alternating current source 32, i.e., during the opposite portion of each full wave, forwardly biasing the anode-cathode of controlled rectifier 18. During the negative half-cycles, if the temperature sensed by thermistor 13 is above a predetermined point, the bridge becomes unbalanced and the voltage of bridge node D becomes sufficient positive with respect to node C that a current flows into the control electrode of the controlled rectifier 71. The controlled rectifier 71 then fires for a predetermined portion of each negative half-cycle and delivers power to the heater resistor 76 which is included in the interlock relay 80. This relay further comprises bimetallic movable contact 81 and fixed contacts 82, 83. Upon heating, contact 81 is disengaged from fixed contact 83 and engages fixed contact 82. Power is thereby removed from load 10 and coupled to cooling source 75. The interlock switch thus positively prevents power from being delivered simultaneously to both the heating and cooling sources and also provides a predetermined time delay for connecting power to the cooling source. Accordingly, repeated manual adjusting of the temperature select rheostat 15 does not result in corresponding repeated turn on and off of the compressor of air conditioner compressor with possible overloading and damage thereto.

A negative temperature coefficient thermistor 85 provides an outdoor temperature compensation during periods of hot and of cold weather. Thus, the resistance of the bridge leg DB increases as the outdoor temperature decreases, thereby increasing the voltage of bridge node D with respect to node C. The controlled rectifier then fires at a higher room temperature than normal. During periods of high outdoor temperature, the resistance of bridge leg DB decreases as the outdoor temperature increases. The cooling source 75 is then operated at lower room temperatures than normal.

Negative temperature coefficient thermistor 55, positive temperature coefficient thermistor 56 and heater resistor 57 function in the same manner as in the system described hereinabove and illustrated in FIG. 4, providing ambient compensation and improved sensitivity of response.

A preferred system for controlling both heating and cooling elements is shown in FIG. 6. In this and the following embodiments, those components which may be identical to those described hereinabove having been given the same identification numerals. The alternating current bridge 100 is energized by alternating current source 32 connected to transformer 30 having a center tapped secondary winding 33 which comprises bridge legs AC and CB. Bridge leg AD comprises positive temperature coefficient thermistor 13 and a temperature adjusting variable resistor 15 connected in series to form a "thermostat." Bridge leg DB comprises fixed resistance 101 in series with a calibrating variable resistance 102 and parallel connected phase shift capacitor 103. As described above, the conductive angle of the controlled rectifier is varied by the addition of such a capacitor.

In the circuitry of this and the following embodiments, the controlled rectifier 18 may be selectively fired by either half of each A.C. cycle, this being accomplished by means which connect the anode and cathode of this controlled rectifier so that these electrodes can be forwardly biased on alternate halves of each A.C. cycle. Thus, the anode of controlled rectifier 18 is connected to bridge node A via diode 110, controlled heating source 10 and thermally opearted switch 111. As shown, this switch includes a movable contact 112 connected to node A and fixed contact 113 connected to one terminal of the controlled heating source. The other fixed contact 114 of this switch is connected to one terminal of the controlled cooling source 75.

Other means connect the anode of controlled rectifier 18 to bridge node B, these means comprising diode 120 and heater resistance 121. Current through this resistor controls the actuation of switch 111. This may be accomplished as shown by locating a bimetallic element 122 proximate the heater resistance 121, element 122 being operatively coupled to movable contact 111.

The firing current supplied the controlled rectifier is determined by an unbalance of bridge 100 which causes a voltage differential between bridge nodes D and C. The resultant current flow between these nodes is connected from node D to the control electrode of controlled rectifier 18 by resistor 130.

The operation of the temperature control system shown in FIG. 6 is as follows: Assuming that the temperature selected by the temperature adjusting rheostat 15 is being maintained by the controlled heat source 10, the bridge 100 is then balanced and no control current flows through resistor 130 into the control electrode of the controlled rectifier 18. Assume, however, that the temperature of the controlled environment decreases and so becomes less than the desired temperature. The resistance of the thermistor sensing element then decreases and the voltage drop across bridge leg AD is less than the voltage drop across the leg DB. During half-cycles of positive polarity of the source 32, the bridge unbalance produces a positive voltage between bridge nodes D and C. Consequently, a current flows from node D to node C through the control electrode and cathode of the controlled rectifier. These same positive half-cycles forwardly bias the anode-cathode of the controlled rectifier. Accordingly, the controlled rectifier is caused to fire during such positive halves of each A.C. cycle resulting in a flow of anode to cathode current through controlled heating source 10. The resulting temperature rise causes an increase in resistance of the temperature sensing thermistor 13. When the bridge is at or very near a balanced condition, the control current is reduced to a sufficiently low value that the rectifier completely ceases to fire, thereby blocking the flow of control current to the controlled heat source 10.

During the above-described operation, the controlled cooling source 75 is de-energized because of the open switch contacts 112, 114. Assume, however, that the temperature of the controlled environment increases and so becomes greater than the desired temperature. The resistance of the thermistor sensing element 13 then increases and the bridge becomes unbalanced with the voltage drop across bridge leg DB being less than the voltage drop across the leg AD. During half-cycles of negative polarity of source 32, the bridge unbalance produces a positive voltage between bridge nodes D and C. These same negative half-cycles forwardly bias the anode-cathode of the controlled rectifier via resistor 121 and diode 120. Consequently, a current flows from node D to node C through the control electrode and cathode of the controlled rectifier causing this element to fire during these negative halves of each A.C. cycle. The resulting flow of anode to cathode current causes a flow of current through heater resistance 121. After a few cycles of A.C. current, the bimetallic element 122 causes movable switch contact 112 to disconnect from fixed contact 113. Continued heating of the bimetallic element causes contact 112 to engage fixed contact 114 at which time the controlled cooling source 75 is connected across the secondary winding 33. Accordingly, the cooling source is energized until the thermistor 13 responds to an increased environmental temperature to rebalance the bridge and so reduce the control current to a sufficiently low value that the controlled rectifier ceases to fire. The bimetallic element 122 then cools and movable contact 112 becomes disconnected from fixed contact 114 to de-energize the controlled cooling source 125.

The diodes 110, 120 prevent current flow from one side of the secondary winding 33 to the other side without passing through the controlled rectifier 18. As shown, these diodes conduct, from their respective sides of winding 33, in the same directional sense as the controlled rectifier and in opposite directions with respect to each other. As a result, load currents flow through either diode 110 or 120 and through the controlled rectifier 18 when the latter element is fired, but no current can flow in either load device without flowing through the controlled rectifier.

The temperature control circuit of FIG. 6 and those described hereinafter offer the significant advantage that only one controlled rectifier element is required for controlling the energization of both heating and cooling sources. This is important not only from the standpoint of minimizing circuit complexity but also because of the fact that a controlled rectifier element represents a substantial cost item in the control circuit. The additional two diodes 110, 120 are quite inexpensive and accordingly do not substantially reduce the cost saving provided by eliminating one controlled rectifier.

Another advantage inherent in the control circuit of FIG. 6 is that it is not possible for the controlled rectifier to be fired for both heating and cooling; thus, these two functions are interlocked to prevent simultaneous heating and cooling. However, it is usually desirable to provide a time delay prior to the starting of the cooling source in order to prevent manual jogging of the compressor of the cooling source by manual actuation of the temperature selecting rheostat 15. Hence, the use of the thermally operated switch 111.

The temperature control system of FIG. 6 offers minimal dead band, that is the temperature change required to energized one of the loads following de-energization of the other load. In this circuit, the sensitivity is a function of the firing voltage of the controlled rectifier employed in the circuit, a representative dead band being 4° F.

A modified embodiment of the invention having a variable dead band is shown in FIG. 7 wherein a rheostat 140 is connected between the control electrode and the cathode electrode of the controlled rectifier 18. A portion of the control current thus bypasses the control electrode; as a result, an increased temperature change is necessary to cause firing of the controlled rectifier for either cooling or heating of the thermistor temperature sensor from the temperature sensor 13 preset by rheostat 15. A diode 141 in the path of the control current prevents a reverse flow of current between the bridge nodes C and D.

In another embodiment of the invention shown in FIG. 8, both a decreased and variable dead band is provided by diode circuitry which isolates the electrical position of the control electrode for alternate halves of each A.C. cycle. Accordingly, the amount of bridge unbalance required to fire the controlled rectifier may be different for positive half-cycles than for negative half-cycles. As shown, the thermistor 13 and temperature regulating rheostat 15 connected in series across phase shift capacitor 103 are connected between bridge node A and B by parallel paths 150, 151. Path 150 includes a potentiometer 152 and diode 153 and path 151 includes fixed resistors 154, 155 and diode 156. Diodes 153, 156 are oppositely polled and connected to node B via a fixed resistor 157. Control current is supplied the control electrode of control rectifier 18 via parallel paths comprising diode 160 whose anode is connected between respective resistors 154 and 155 and diode 161 connected to the movable arm of potentiometer 152.

In operation, the bridge arm AD for positive half-cycles comprises path 151 whereas this arm for negative half-cycles comprises path 150. The control current magnitude supplied the control rectifier 18 during negative half-cycles is determined by the setting of potentiometer 152. Accordingly, the circuit of FIG. 8 can be adjusted to give a dead band of substantially 0° F. However, a more minimum practical limit is of the order of 1.5° F. which is also easily preset by potentiometer 152.

The system shown in FIG. 8 also illustrates an alternative connection of the controlled cooling source 75, this source being directly connected in the path of the anode current of the controlled rectifier by direct connection to diode 120. This same structure may be used in circuits of FIGS. 6 and 7 described above and FIG. 9 described hereinafter, since it is not possible for the controlled rectifier to turn on for both heating and cooling. However, the thermally operated switch shown in FIGS. 7, 8 and 9 is usually desired in order to prevent manual jogging of the compressor of the cooling source, as described above.

A detailed system schematic is shown in FIG. 9. This embodiment is designed for use as an ON-OFF system and therefore includes no phase shifting capacitor. The A.C. energized bridge 170 includes bridge leg DB comprising fixed balance resistor 171 and temperature selector rheostat 15. Bridge leg AD includes calibration rheostat 173, positive temperature coefficient thermistor 13 and fixed resistor 175. Dual load circuits connected to the anode of controlled rectifier 18 include diode 181 and heater resistor 182 in one load path connected to bridge node B and diode 183, solenoid valve 184, selector switch 190 and thermal switch 186 comprise another load path connected to bridge node A. Switch 190 provides three switch modes determined by the position of switch actuators 191, 192. The first position of the switch is an automatic cooling mode and is illustrated in FIG. 9. In this position, a relay 193 adapted for energizing a cooling source is connected between bridge node B and bridge node A via movable actuator 192 and fixed contacts 194, 195 and the thermal switch 186 comprising bimetallic actuator 187 and fixed contact 196.

In the second position, or automatic cooling and heating mode, the cooling relay remains connected via actuator 192 and fixed contacts 195, 197. Also, solenoid valve 184 is connected to bridge node A via actuator 191, fixed contacts 185, 200 of switch 190 and fixed contact 201 and movable contact 187 of the thermal switch 186. Thus connected, the circuit functions in the manner of the circuits of FIGS. 6 and 7, the position of bimetallic actuator 186 and firing of controlled rectifier 18 determining whether current is supplied the cooling relay 193 or the valve of solenoid 184, the latter element typically providing an on-off control over gas flow to a furnace.

In the third switch position or automatic heating mode, the solenoid 184 remains in circuit with the controlled rectifier and the cooling relay 193 is disconnected therefrom.

Fan relay 210 is connected between bridge node B and movable contact 211 of selector switch 212, this switch having a manual and automatic position. In the former position, the fan is continuously energized whereas in the automatic position the fan is connected in parallel with the cooling relay 193 and is energized only at such time that the cooling relay is connected by the controlled rectifier 18.

Each of the embodiments described hereinabove may further include capacitor 220 connected between the control and cathode electrodes of the controlled rectifier 18 and negative temperature coefficient (NTC) thermistor 221 connected between the control electrode of controlled rectifier 18 and the center tap of transformer 30, shown in the embodiment of FIG. 9. Capacitor 220 acts as a low shunt impedance to miscellaneous voltage peaks reaching the control electrode. Otherwise, these sharp wavefront electrical impulses can add just enough control current to cause firing of the rectifier 18 for a few A.C. cycles, which in turn results in unnecessary actuation of the solenoid valve 184.

Thermistor 221 obviates firing of the controlled rectifier 18 due to small changes in line potential, i.e., changes in output voltage of A.C. source 32 when the controlled rectifier is near its triggering point. Such changes occur, for example, when loads are placed on or removed from the line. In actual tests involving home heating systems, it has been found that such line fluctuations can cause short heating cycles, that is, an energization or deenergization of the heating source to change the temperature by a very small amount, e.g., one-quarter degree so as to rebalance the bridge. If line voltage changes occur frequently and while the controlled rectifier is near its triggering point, the frequency of solenoid operation, ignition and flame extinction may occur objectionably often. In the circuit of FIG. 9, the self-heating of NTC thermistor 221 biases the control-cathode voltage such that the controlled rectifier, when conducting tends to remain conducting, and conversely, when non-conducting to remain non-conducting. Thus, minor variations in line voltage are not able to change the firing condition of the controlled rectifier.

The operation of the NTC thermistor is as follows: When the controlled rectifier 18 is fired by each positive half-cycle, the resistance of thermistor 221 decreases due to the self heating caused by the flow of anode-cathode current. The resistance of thermistor 221 then decreases to bring the cathode potential closer to the center tap potential, thereby increasing the control-cathode potential. The controlled rectifier will then tend to remain in a fixed condition.

If the controller rectifier assumes its unfired condition due to a balanced bridge condition, the resistance of thermistor 221 increases. The cathode potential is then brought closer to the gate and there will be less tendency for the controlled rectifier to fire.

Thermistor 221 should be low in resistance so that it will absorb negligible power from the load, have a low thermal capacity so that its resistance will change appreciably due to self-heating during a single half-cycle of load current flow, yet high enough to retain some heat from cycle to cycle. By way of specific example, wafer thermistors having a resistance value of the order of 20 ohms at room temperature such as are manufactured by Gulton Industries, Metuchen, New Jersey, have been found to provide these performance specifications.

With the addition of thermistor 221, it has been found that even at very low rates of change of environmental temperature with attendant long periods when the controlled rectifier is near its triggering point, there is no tendency to "short cycle" due to electrical changes.

Although exemplary embodiments of the invention have been disclosed and discussed, it will be understood that other applications of the invention are possible and the embodiments and methods disclosed may be subjected to various changes, modifications and substitutions without necessarily departing from the spirit of the invention.

I claim:

1. A system for controlling the temperature of a given environment to a predetermined temperature comprising:
   first and second controlled rectifiers each having an anode, a cathode and a control electrode for regulating the firing of said rectifier when said controlled rectifier is forwardly biased;
   means connectnig the cathode electrodes of said controlled rectifiers;
   means for alternately forward biasing said first and second controlled rectifiers,
   means connected to the control electrode of said first controlled rectifier for feeding back a signal thereto responsive to the temperature of said given environment, said means causing said controlled rectifier to periodically fire during intervals of forward bias when the environmental temperature is lower than said predetermined temperature,
   means connected to the control electrode of said second controlled rectifier for feeding back a signal thereto responsive to the temperature of said given environment, said means causing said controlled rectifier to periodically fire during intervals of forward bias when the temperature of said environment is above said predetermined temperature,
   means for controlling a heating source connected in circuit with the anode and cathode electrodes of said first controlled rectifier, and
   means for controlling a cooling source connected in circuit with the anode and cathode electrodes of said second controlled rectifier.

2. A temperature control system for controlling both heating and cooling sources including:
   first and second controlled rectifiers each comprising a four region semiconductor diode including anode and cathode connections to respective outer regions and a control electrode connected to one of the inner regions thereof, the firing of said diode being regulated by the control electrode current when said diode is forwardly biased,
   a thermistor in thermal proximity to the environment whose temperature is to be controlled,
   a rheostat for preselecting the temperature within said environment,
   a four leg bridge circuit including said thermistor and rheostat and having first and second legs adapted for alternating current energization,
   means connecting the anode and cathode of said first controlled rectifier across said first bridge leg,
   means connecting the anode and cathode of said second controlled rectifier across said second bridge leg,
   means connecting the control electrode of said first controlled rectifier to the node between said third and fourth bridge legs so that an unbalance of said bridge caused by temperature lower than said preselected temperature causes a flow of current in the control electrode of said first control rectifier which in turn results in a firing of said controlled rectifier for positive anode cathode half cycles of said alternating current input,
   means connecting said control electrode of said second control rectifier to the node between said third and fourth legs so that an unbalance of said bridge caused by temperatures higher than said preselected temperature causes a flow of current in the control electrode of said second controlled rectifier for negative anode-cathode half cycles of said alternating current input,
   means for increasing the environmental temperature connected in circuit with the anode and cathode of said first controlled rectifier, and
   means for decreasing the environmental temperature connected in circuit with the anode and cathode of said second controlled rectifier.

3. The temperature control system defined in claim 2 wherein:
   said thermistor and said rheostat are series connected in one only of said bridge legs.

4. A temperature control system comprising:
   first and second controlled rectifiers each comprising a four region P–N–P–N semiconductor diode including anode and cathode connections to respective P and N regions and a control electrode connected to an inner P region, the firing of said diode and resultant current flow between said anode and cathode being regulated by the control electrode current when said diode is forwardly biased;
a temperature sensing thermistor having a positive temperature coefficient of resistance in thermal proximity to said environment;
a rheostat for preselecting the desired temperature within said environment;
a second thermistor having a negative temperature coefficient of resistance in thermal proximity to said controlled rectifier;
a heater resistance;
a third thermistor having a positive temperature coefficient in thermal proximity to said heater resistance;
a transformer having a primary winding and a center tapped secondary winding;
a four leg bridge circuit having
first and second legs comprising respective sections of said secondary winding,
a third leg including said first thermistor, said rheostat and said third thermistor connected in series, and
a fourth leg including said second thermistor;
a controlled heat source connected in series with said anode and cathode of said first controlled rectifier between one end of said secondary winding and a mid point thereof;
a controlled cooling source connected in series with said anode and cathode of said second controlled rectifier between the other end of said secondary winding and the mid point thereof; and
means connecting said third and fourth bridge legs to the control electrodes of said first and second controlled rectifiers so that a predetermined unbalance of said bridge causes a sufficient flow of current in either the control electrode of said first or second controlled rectifier to cause firing thereof for those half cycles of alternating current which forwardly bias said controlled rectifier.

5. A temperature control system for controlling both heating and cooling sources including:
a controlled rectifier having an anode, a cathode, and a control electrode for regulating the firing of said rectifier when said rectifier is forwardly biased;
temperature sensor means for providing a resistance which varies with the environmental temperature;
means for selecting a predetermined temperature;
a four leg alternating current energized bridge circuit including said temperature sensor and said temperature selector means;
first and second means respectively connecting the anode and cathode of said controlled rectifier across first and second bridge legs; and
means connecting said control electrode to the node between third and fourth bridge legs so that an unbalance of said bridge causes a flow of current in said control electrode which in turn results in firing of said controlled rectifier in one or the other half cycle of said alternating current energization,
said first means including means for energizing an environmental heating source,
said second means including means for energizing an environmental cooling source.

6. The temperature control system defined in claim 5 wherein
said first and second means each include a diode, said diodes being oppositely poled to conduct current during respective alternate half cycles of said alternating current energization.

7. The temperature control system defined in claim 5 wherein said second means comprises a diode and said cooling source directly connected as an anode-cathode load circuit of said controlled rectifier.

8. The temperature control system defined in claim 5 wherein
said second means comprises a diode and thermal switch connected as an anode-cathode load circuit of said controlled rectifier, said switch operatively connected to said cooling source.

9. The temperature control system defined in claim 8 wherein
said thermal switch includes a movable contact and first and second fixed contacts, said first and movable contacts being connected in series with said heating source and said second and movable contacts being connected in series with said cooling source.

10. The temperature control system defined in claim 5 comprising
means for varying the temperature change required to energize the heating or cooling source following de-energization of the other of said sources including a variable resistance connected between the cathode and control electrode of said controlled rectifier.

11. The temperature control system defined in claim 5 comprising
means for varying the temperature change required to energize the heating or cooling source following de-energization of the other of said sources including means for isolating the electrical position of said control electrode for alternate halves of an alternating current cycle so that the amount of bridge unbalance required to fire the controlled rectifier may be different for positive half cycles than for negative half cycles of said alternating current energization.

12. A temperature control system for controlling both heating and cooling sources comprising
controlled current conductive means comprising a first electrode, a second electrode, and a control electrode having a fired or current conductive state determined by current flow in said control electrode and forward bias applied across said first and second electrodes;
temperature sensor means for providing a resistance which varies with the environmental temperature;
an alternating current bridge including said temperature sensor, said bridge being unbalanced when said environmental temperature varies from a predetermined temperature;
first and second means connecting said first and second electrodes to said alternating current bridge so that said electrodes are forwardly biased on alternate halves of each A.C. cycle,
said first means including means for energizing an environmental heating source and said second means including means for energizing an environmental cooling source;
means for varying the temperature change required to energize the heating or cooling source following de-energization of either of the other said sources including
one leg of said alternating current bridge having third means for providing a first current path for positive halves of each A.C. cycle and fourth means for providing a second current path for negative halves of each A.C. cycle; and
means for connecting said control electrode to both of said third and fourth means of said one bridge leg so that the amount of bridge unbalance required to fire said controlled current conductive means may be different for positive half cycles than for negative half cycles.

13. A temperature control system for controlling both the heating and cooling sources comprising
first means including a first electrode, a second electrode, and a control electrode having a fired or current conductive state determined by current flow in said control electrode and forward bias across said first and second electrodes;

second means for connecting said first and second electrodes to a source of alternating current so that said electrodes are forwardly biased on alternate halves of each A.C. cycle;

third means coupled to said control electrode for supplying a firing current thereto during one half of an A.C. cycle when the environmental temperature is lower than a preselected temperature and during the other half of each A.C. cycle when the environmental temperature is greater than the preselected temperature; and fourth means connected in circuit with said first and second electrodes for energizing an environmental heating source when said first means is fired on said one half cycle and for energizing an environmental cooling source when said second means is fired on said other half cycle.

14. A temperature control system comprising:
(a) a controlled rectifier including an anode, a cathode and a control electrode, said control electrode firing said rectifier and controlling the magnitude of current flow between said anode and cathode when said rectifier is forwardly biased;
(b) a transformer having a primary winding and a center-tapped secondary winding;
(c) a four leg bridge circuit having first and second legs comprising respective sections of said secondary winding;
(d) a third leg including first and second temperature sensing thermistors having positive temperature coefficients of resistance connected in series, said first thermistor responsive to temperature changes in the environment to be controlled;
(e) a fourth leg including a rheostat and a third thermistor having a negative temperature coefficient of resistance, said rheostat variable to preselect the temperature of the environment at which the bridge circuit is balanced and said third thermistor being disposed in thermal proximity to said controlled rectifier to receive heat therefrom;
(f) a heater resistance in thermal proximity to said second thermistor to receive heat therefrom connected in said anode-cathode circuit;
(g) a controlled heat source connected in series with said anode and cathode between one end of said secondary winding and a midpoint thereof; and,
(h) means including a current limiting resistor connecting said third and fourth bridge legs to the control electrode of said controlled rectifier so that an unbalance of said bridge causes a flow of current in said control electrode which in turn results in a firing of said controlled rectifier for those half cycles of alternating current input which forwardly bias said controlled rectifier.

15. A system for controlling the temperature of a given environment to a predetermined temperature comprising, in combination,
(a) a controlled rectifier having an anode, a cathode and a control electrode, said control electrode regulating the firing of said rectifier when said controlled rectifier is forwardly biased;
(b) means comprising an alternating current, normally balanced bridge circuit connected to said controlled rectifier for alternately biasing said controlled rectifier in forward and reverse directions;
(c) impedance means responsive to the temperature of said given environment and means for preselecting the predetermined temperature at which said bridge is normally balanced serially connected in one leg of said bridge circuit, said serially connected means connected to the remainder of the control system by only two electrical leads to control the firing point of said controlled rectifier during intervals of forward bias to reestablish the balance of said bridge circuit; and
(d) environment temperature varying means connected in circuit with the anode and cathode electrodes of said controlled rectifier and responsive to the fired condition of said rectifier to reestablish said predetermined environmental temperature, thereby causing the value of said temperature responsive impedance means to change in a manner which rebalances said bridge circuit.

16. A temperature control system for an area comprising:
(a) a controlled rectifier having an anode, a cathode, and a control electrode, said control electrode regulating the firing of said rectifier when said rectifier is forwardly biased;
(b) a balanced alternating current energized bridge circuit including temperature sensor and temperature selector means in only one of its legs;
(c) said temperature sensor operable to provide a resistance which is systematically related to the environmental temperature in the controlled area;
(d) said temperature selector means operable to preselect a desired equilibrium environmental temperature;
(e) a heat source located in the controlled area and connected in circuit with the anode and cathode electrodes; and
(f) means connecting the control electrode of said controlled rectifier to said bridge so that a current proportional to the unbalance of said bridge flows through said control electrode to control the firing of said rectifier so that cathode-anode current flows through said controlled rectifier and said heat source to reestablish said predetermined temperature within said controlled area thereby causing the resistance of said temperature sensor to change in a manner which rebalances said bridge circuit.

17. A system for controlling the temperature in an area including:
(a) a controlled rectifier having an anode, a cathode and a control electrode, the firing cycle of said rectifier being controlled by the flow of current through said control electrode when said rectifier is forwardly biased;
(b) a four-leg bridge circuit having sources of alternating current in its adjacent first and second legs;
(c) the anode and cathode of said rectifier attached to the nodes defining one of said first and second bridge legs;
(d) a thermistor and rheostat serially connected in a third leg of the bridge circuit as a control means, said control means being connected to the nodes of said bridge circuit by only two electrical leads;
(e) a balancing impedance connected in the fourth leg;
(f) said thermistor being in the environment of the area in which the temperature is to be controlled so as to receive heat therefrom to produce a resistance systematically related to said temperature;
(g) said control electrode of said rectifier connected to the node between said third and fourth legs so that an unbalance of said bridge caused by a change in the environmental temperature responsive thermistor will cause current to flow through said control electrode to fire said controlled rectifier for positive anode-cathode half cycles of said alternatnig current input; and
(h) means connected in circuit with the anode and cathode of said controlled rectifier responsive to anode-cathode current flow in said rectifier to reestablish the preselected environmental conditions to thereby rebalance the bridge circuit.

(References on following page)

References Cited by the Examiner

UNITED STATES PATENTS

| | | | |
|---|---|---|---|
| 3,028,473 | 4/62 | Dyer et al. | |
| 3,050,611 | 8/62 | Kamide | 219—20.41 |
| 3,051,813 | 8/62 | Busch et al. | |
| 3,051,815 | 8/62 | Hukee et al. | |
| 3,062,942 | 11/62 | Finlay et al. | |
| 3,071,676 | 1/63 | Van Sandwyk | 213—20.41 |
| 3,097,314 | 7/63 | Harriman. | |
| 3,114,025 | 12/63 | Blauvelt et al. | 219—501 |
| 3,161,759 | 12/64 | Gambill et al. | 219—501 X |

OTHER REFERENCES

SCR Manual (2nd Ed.), Copyright 1961, General Electric Co.

JAMES W. WESTHAVER, *Primary Examiner.*